(12) United States Patent
Gu et al.

(10) Patent No.: US 7,985,374 B2
(45) Date of Patent: Jul. 26, 2011

(54) CADMIUM-FREE SILVER BRAZING FILLER METAL

(75) Inventors: Wenhua Gu, Jiangsu (CN); Liyong Gu, Jiangsu (CN); Songbai Xue, Jiangsu (CN); Jianchang Gu, Jiangsu (CN)

(73) Assignee: Changshu Huayin Filler Metals Co., Ltd. (CN)

( * ) Notice: Subject to any disclaimer, the term of this patent is extended or adjusted under 35 U.S.C. 154(b) by 0 days.

(21) Appl. No.: 12/516,194

(22) PCT Filed: Jan. 22, 2007

(86) PCT No.: PCT/CN2007/000237
§ 371 (c)(1),
(2), (4) Date: Jan. 11, 2010

(87) PCT Pub. No.: WO2008/061406
PCT Pub. Date: May 29, 2008

(65) Prior Publication Data
US 2010/0135849 A1    Jun. 3, 2010

(30) Foreign Application Priority Data
Nov. 26, 2006   (CN) .......................... 2006 1 0097768

(51) Int. Cl.
*C22C 30/02*    (2006.01)
*B23K 35/34*    (2006.01)

(52) U.S. Cl. ......................................... 420/587; 148/24
(58) Field of Classification Search ................. 420/587, 420/503; 148/24
See application file for complete search history.

(56) References Cited

U.S. PATENT DOCUMENTS

| | | | | |
|---|---|---|---|---|
| 5,830,585 A | * | 11/1998 | Hosoe et al. | 428/615 |
| 6,027,575 A | | 2/2000 | Paruchuri et al. | |

FOREIGN PATENT DOCUMENTS

| | | | |
|---|---|---|---|
| CN | 1765564 A | | 5/2006 |
| CN | 1775459 A | * | 5/2006 |
| CN | 1836823 A | | 9/2006 |
| JP | 2005-286274 A | | 10/2005 |

OTHER PUBLICATIONS

International Search Report issued in corresponding Chinese PCT/CN2007/000237, dated Aug. 30, 2007.

* cited by examiner

*Primary Examiner* — Roy King
*Assistant Examiner* — Caitlin Fogarty
(74) *Attorney, Agent, or Firm* — Rossi, Kimms & McDowell LLP

(57) ABSTRACT

A cadmium-free silver brazing filler metal containing gallium, indium, nickel and cerium falls into the field of metal material and metallurgy. Its chemical composition includes (by mass percentage) Cu 28.0%-35.0%, Zn 28.0%-38.0%, Ga 0.1%-2.5%, In 0.1%-2.5%, Ni 0.1%-2.5%, Ce 0.002%-0.1%, and Ag in balance.

1 Claim, No Drawings

CADMIUM-FREE SILVER BRAZING FILLER METAL

This application is a U.S. National Phase Application of PCT International Application PCT/CN2007/000237 filed on Jan. 22, 2007, which is based on and claims priority from CN 200610097768.0 filed on Nov. 26, 2006, the contents of each of which are incorporated herein in their entirety by reference.

FIELD OF THE INVENTION

The present invention relates to a cadmium-free silver brazing filler metal containing gallium, indium, nickel, and cerium, and particularly a cadmium-free silver brazing filler metal applicable for brazing metal materials, such as red copper, brass, carbon steel, stainless steel, and Ni-based alloy, etc., it belongs to brazing filler metal materials in fields of metal materials and metallurgy.

BACKGROUND OF THE INVENTION

The present available silver brazing filler metals BAg25CuZn and BAg45CuZn contain silver contents respectively of 25% and 45% in their chemical compositions. Although BAg25CuZn and BAg45CuZn bear excellent silver brazing filler metal performance, their wettability and spreadability are much inferior to those of cadmium-containing silver brazing filler metals BAg35CuZnCd and BAg45CuZnCd, and also take on much higher solidus-liquidus temperatures. But due to cadmium adverse impact on operator's health and its pollution to the environment, particularly the implementation of EU ROHS Directive on Jul. 1, 2006, cadmium-containing material is being banned from usage gradually, thus employing BAg35CuZnCd and BAg45CuZnCd instead of BAg25CuZn and BAg45CuZn will certainly be limited. Therefore, research and development of cadmium-free silver brazing filler metal, which bears overall performance equavalent to or the same as those of BAg35CuZnCd and BAg45CuZnCd, with its silver content about 30% and solidus-liquidus temperatures lower than those of BAg25CuZn, not only bears good practicability and important economic value, but also benefit for environment protection.

SUMMARY OF THE INVENTION

The object of the present invention is to provide a cadmium-free silver brazing filler metal containing gallium, indium, nickel, and cerium which bears overall performance equavalent to those of conventional brazing filler metals BAg35CuZnCd and BAg45CuZnCd, and excellent brazing properties, and ensures that the welding part is free of toxic element cadmium during and after the brazing process.

The object of the present invention is achieved as below. A cadmium-free silver brazing filler metal containing gallium, indium, nickel and cerium bears chemical composition including (by mass percentage) Cu 28.0%-35.0%, Zn 28.0%-38.0%, Ga 0.1%-2.5%, In 0.1%-2.5%, Ni 0.1%-2.5%, Ce 0.002%-0.1%, and Ag in balance.

The invention has the following advantages:
1) as toxic cadmium element is no longer existed, operator's health can be protected, and environment pollution can be avoided;
2) owing to overall performances are equivalent or similar to those of traditional cadmium-containing silver brazing filler metal with silver contents of 35% and 45% respectively, the brazing filler metal in the present invention can be used to replace silver brazing filler metal BAg35CuZnCd and BAg45CuZnCd;
3) optimizing the contents of Ga, In, and Ni and three main elements Ag, Cu, and Zn, the brazing filler metal in the present invention takes on good wettability, spreadability, and brazing seam mechanical properties ($\sigma_b$, $\tau$);
4) added with appropriate amount of Ga and In, the brazing filler metal in the present invention creates lower melting point without increasing too much raw material cost;
5) added with appropriate amount of Ni, the brazing filler metal in the present invention has improved the wettability for red copper, brass, carbon steel, stainless steel, and Ni-based alloy, etc. and the anticorrosion performance at welding joint; added with rare earth element Ce, the brazing filler metal in the present invention which makes grain refine to improve the plasticity and comprehensive mechanical properties.

DETAILED DESCRIPTION OF THE EMBODIMENT

1) Commercial silver, electrolytic copper, zinc ingot, nickel plate, metallic gallium, metallic indium, and metallic cerium are adopted and mixed in proportion, smelted by common medium-frequency smelting furnace, cast, extruded, and drawn to obtain the desirable brazing filler metal wire; 2) according to manufacture requirement, metallic gallium, metallic indium, and metallic cerium are smelted into alloy, then added into Ag—Cu—Zn alloy, smelted, cast, extruded, and drawn to obtain the desirable brazing filler metal wire. The obtained brazing filler metal wire bears solidus temperature within 630° C.-645° C., and liquidus temperature within 715° C.-735° C. (silver brazing filler metal BAg25CuZn bears solidus temperature of 700° C., and liquidus temperature of 800° C.). Applied together with FB102 (QJ102) brazing flux, the brazing filler metal material in the present invention can achieve brazing seam mechanical properties of $\sigma_b$=185-365 MPa and $\tau$=180-355 MPa when the brazing materials are the combinations as followed: red copper-brass, brass-carbon steel, and stainless steel-nickel-based alloy.

The desirable brazing filler metal wire can be obtained by smelting raw materials in common medium-frequency smelting furnace, casting, extruding, and drawing; the cadmium-free silver brazing filler metal containing Ga, In, Ni, and Ce is applied together with FB102 (QJ102) brazing flux, which can achieve the wettability and spreadability for the parent material, and brazing seam mechanical properties ($\sigma_b$=185-365 MPa, $\tau$=180-355 MPa) equivalent or similar to those of reference brazing filler metal materials BAg35CuZnCd and BAg45CuZnCd containing silver 35% and 45% respectively when the brazing materials are the combinations as followed: red copper-brass, brass-carbon steel, and stainless steel-nickel-based alloy. The cadmium-free silver brazing filler metal containing Ga, In, Ni, and Ce in the present invention is completely free of toxic element cadmium, effectively protects operator's health, and eliminates environment pollution. The brazing filler metal in the present invention has brazing seam mechanical property index equivalent to those of brazing filler metals BAg35CuZnCd and BAg45CuZnCd. Therefore, the brazing filler metal in the present invention can be used to replace brazing filler metals BAg35CuZnCd and BAg45CuZnCd in fields of metal materials and metallurgy.

Embodiment 1

A cadmium-free silver brazing filler metal containing Ga, In, Ni, and Ce has composition as below: (by mass percentage) Cu 32.0%, Zn 35.0%, Ga 2.5%, In 2.5%, Ni 2.5%, Ce 0.002%, and Ag in balance.

The brazing filler metal with the aforementioned composition has solidus temperature and liquidus temperature around 630° C. and 715° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless steel-nickel-based alloy ($\sigma_b$=350±15 MPa, $\tau$=260±10 MPa).

Embodiment 2

A cadmium-free silver brazing filler metal containing Ga, In, Ni, and Ce has composition as below: (by mass percentage) Cu 32.0%, Zn 35.0%, Ga 0.1%, In 0.1%, Ni 0.1%, Ce 0.1%, and Ag in balance.

The brazing filler metal with the aforementioned composition has solidus temperature and liquidus temperature around 645° C. and 735° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210 ±25MPa, $\tau$=200±30MPa), brass-carbon steel ($\sigma_b$=330±25 MPa, $\tau$=325±30 MPa), and stainless steel-nickel-based alloy ($\sigma_b$=350±15MPa, $\tau$=260±10MPa).

Embodiment 3

A cadmium-free silver brazing filler metal containing Ga, In, Ni, and Ce has composition as below: (by mass percentage) Cu 28.0%, Zn 38.0%, Ga 0.1%, In 2.5%, Ni 0.5%, Ce 0.03%, and Ag in balance.

The brazing filler metal with the aforementioned composition has solidus temperature and liquidus temperature around 630° C. and 725° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210 ±25 MPa, $\tau$=200±30 MPa), brass-carbon steel ($\sigma_b$=330±25 MPa, $\tau$=325±30 MPa), and stainless steel-nickel-based alloy ($\sigma_b$=350±15MPa, $\tau$=260±10MPa).

Embodiment 4

A cadmium-free silver brazing filler metal containing Ga, In, Ni, and Ce has composition as below: (by mass percentage) Cu 35.0%, Zn 28.0%, Ga 1.5%, In 1.5%, Ni 0.5%, Ce 0.05%, and Ag in balance.

The brazing filler metal with the aforementioned composition has solidus temperature, and liquidus temperature around 630° C. and 725° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless steel-nickel-based alloy ($\sigma_b$=350±15 MPa, $\tau$=260±10 MPa).

Embodiment 5

A cadmium-free silver brazing filler metal containing Ga, In, Ni, and Ce has composition as below: (by mass percentage) Cu 32.0%, Zn 32.0%, Ga 1.5%, In 0.1%, Ni 1.5%, Ce 0.005%, and Ag in balance.

The brazing filler metal with the aforementioned composition has solidus temperature liquidus temperature around 640° C. and 730° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless steel-nickel-based alloy ($\sigma_b$=350±15 MPa, $\tau$=260±10 MPa)).

Embodiment 6

A cadmium-free silver brazing filler metal containing Ga, In, Ni, and Ce has composition as below: (by mass percentage) Cu 32.0%, Zn 38.0%, Ga 0.3%, In 0.5%, Ni 0.2%, Ce 0.05%, and Ag in balance.

The brazing filler metal with the aforementioned composition has solidus temperature and liquidus temperature around 640° C. and 730° C. respectively (experiment error included) Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless-steel-nickel-based alloy ($\sigma_b$=350±15MPa, $\tau$=260±10MPa).

Embodiment 7

A cadmium-free silver brazing filler metal containing Ga, In, Ni, and Ce has composition as below: (by mass percentage) Cu 30.0%, Zn 38.0%, Ga 2.0%, In 1.5%, Ni 1.2%, Ce 0.05%, and Ag in balance.

The brazing filler metal with the aforementioned composition has solidus temperature and liquidus temperature around 635° C. and 730° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless-steel-nickel-based alloy ($\sigma_b$=350±15 MPa, $\tau$=260±10 MPa).

Embodiment 8

A cadmium-free silver brazing filler metal containing Ga, In, Ni, and Ce has composition as below: (by mass percentage) Cu 29.0%, Zn 36.0%, Ga 1.0%, In 1.0%, Ni 1.0%, Ce 0.05%, and Ag in balance.

The brazing filler metal with the aforementioned composition has solidus temperature and liquidus temperature around 640° C. and 730° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25MPa, $\tau$=200±30MPa), brass-carbon steel ($\sigma_b$=330±25 MPa,

Embodiment 9

A cadmium-free silver brazing filler metal containing Ga, In, Ni, and Ce has composition as below: (by mass percentage) Cu 33.0%, Zn 34.0%, Ga 0.8%, In 1.6%, Ni 0.8%, Ce 0.015%, and Ag in balance.

The brazing filler metal with the aforementioned composition has solidus temperature and liquidus temperature around 640° C. and 730° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless steel-nickel-based alloy ($\sigma_b$=350±15 MPa, $\tau$=260±10 MPa).

Embodiment 10

A cadmium-free silver brazing filler metal containing Ga, In, Ni, and Ce has composition as below: (by mass percentage) Cu 30.5%, Zn 35.2%, Ga 0.4%, In 0.9%, Ni 0.3%, Ce 0.005%, and Ag in balance.

The brazing filler metal with the aforementioned composition has solidus temperature of and liquidus temperature around 640° C. and 730° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless steel-nickel-based alloy ($\sigma_b$=350±15 MPa, $\tau$=260±10 MPa).

Embodiment 11

A cadmium-free silver brazing filler metal containing Ga, In, Ni, and Ce has composition as below: (by mass percentage) Cu 30.5%, Zn 35.0%, Ga 1.2%, In 0.9%, Ni 0.5%, Ce 0.002%, and Ag in balance.

The brazing filler metal with the aforementioned composition has solidus temperature and liquidus temperature around 635° C. and 730° C. respectively(experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless steel-nickel-based alloy ($\sigma_b$=350±15 MPa, $\tau$=260±10 MPa).

Embodiment 12

A cadmium-free silver brazing filler metal containing Ga, In, Ni, and Ce has composition as below: (by mass percentage) Cu 32.5%, Zn 36.0%, Ga 2.2%, In 0.2%, Ni 1.5%, Ce 0.008%, and Ag in balance.

The brazing filler metal with the aforementioned composition has solidus temperature of and liquidus temperature around 645° C. and 730° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless steel-nickel-based alloy ($\sigma_b$=350±15 MPa, $\tau$=260±10 MPa).

Embodiment 13

A cadmium-free silver brazing filler metal containing Ga, In, Ni, and Ce has composition as below: (by mass percentage) Cu 32.5%, Zn 36.0%, Ga 1.3%, In 1.2%, Ni 1.5%, Ce 0.008%, and Ag in balance.

The brazing filler metal with the aforementioned composition has solidus temperature and liquidus temperature around 640° C. and 735° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless steel-nickel-based alloy ($\sigma_b$=350±15 MPa, $\tau$=260±10 MPa).

Embodiment 14

A cadmium-free silver brazing filler metal containing Ga, In, Ni, and Ce has composition as below: (by mass percentage) Cu 31.5%, Zn 36.0%, Ga 1.1%, In 1.2%, Ni 0.9%, Ce 0.003%, and Ag in balance.

The brazing filler metal with the aforementioned composition has solidus temperature and liquidus temperature around 640° C. and 730° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless steel-nickel-based alloy ($\sigma_b$=350±15 MPa, $\tau$=260±10 MPa).

Embodiment 15

A cadmium-free silver brazing filler metal containing Ga, In, Ni, and Ce has composition as below: (by mass percentage) Cu 29.5%, Zn 36.5%, Ga 2.3%, In 1.2%, Ni 1.8%, Ce 0.002%, and Ag in balance.

The brazing filler metal with the aforementioned composition has solidus temperature and liquidus temperature around 640° C. and 730° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless steel-nickel-based alloy ($\sigma_b$=350±15 MPa, $\tau$=260±10 MPa)

Embodiment 16

A cadmium-free silver brazing filler metal containing Ga, In, Ni, and Ce has composition as below: (by mass percentage) Cu 29.5%, Zn 36.5%, Ga 0.3%, In 1.2%, Ni 1.2%, Ce 0.002%, and Ag in balance.

The brazing filler metal with the aforementioned composition has solidus temperature and liquidus temperature around 640° C. and 735° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless steel-nickel-based alloy ($\sigma_b$=350±15 MPa, $\tau$=260±10 MPa).

Embodiment 17

A cadmium-free silver brazing filler metal containing Ga, In, Ni, and Ce has composition as below: (by mass percentage) Cu 30.5%, Zn 34.5%, Ga 2.3%, In 2.0%, Ni 1.0%, Ce 0.002%, and Ag in balance.

The brazing filler metal with the aforementioned composition has solidus temperature and liquidus temperature around 630° C. and 715° C. respectively (experiment error included). Applied together with FB102 (QJ102) brazing flux, the brazing filler metal can achieve following brazing seam strength for brazing parent materials (refer to the data in the brackets): red copper-brass ($\sigma_b$=210±25 MPa, $\tau$=200±30 MPa), brass-carbon steel ($\sigma_b$=330±25 MPa, $\tau$=325±30 MPa), and stainless steel-nickel-based alloy ($\sigma_b$=350±15 MPa, $\tau$=260±10 MPa).

The cadmium-free silver brazing filler metal containing Ga, In, Ni, and Ce in the present invention has good wettability to brazing parent materials such as red copper, brass, carbon steel, stainless steel, and nickel-based alloy. Any of the cadmium-free silver brazing filler metals containing Ga, In, Ni, and Ce in the embodiments 1-17 has good wettability for brazing combination of materials (parent materials) and takes on good overall mechanical properties at welding joint when applied for brazing different combination of materials (parent materials), such as red copper-red copper, red copper-brass, red copper-carbon steel, brass-stainless steel, carbon steel-stainless steel, carbon steel-nickel-based alloy, stainless steel-nickel-based alloy, red copper-nickel-based alloy, and brass-nickel-based alloy.

The invention claimed is:

1. A cadmium-free silver brazing filler metal containing Ga, In, Ni, and Ce, wherein, its chemical composition includes (by mass percentage) Cu 28.0%-35.0%, Zn 28.0%-38.0%, Ga 0.1%-2.5%, In 0.1%-2.5%, Ni 0.1%-2.5%, Ce 0.002%-0.1%, and Ag in balance.

* * * * *